(No Model.)
J. C. BLEVNEY.
FRICTION CLUTCH.
No. 306,127. Patented Oct. 7, 1884.
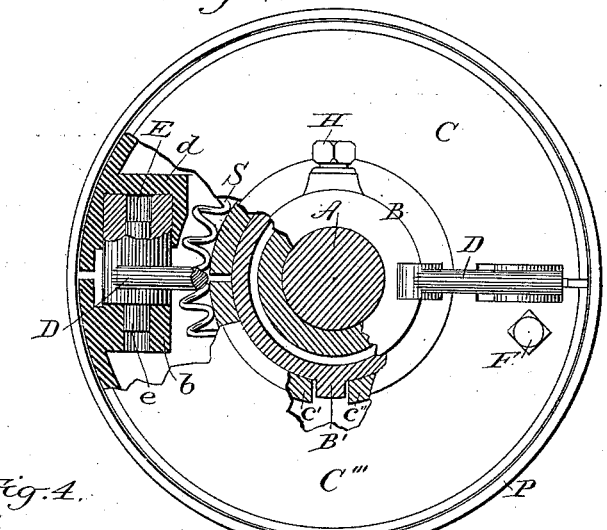
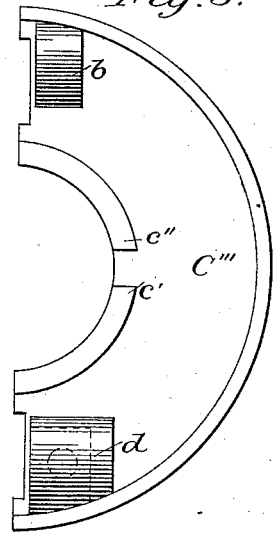
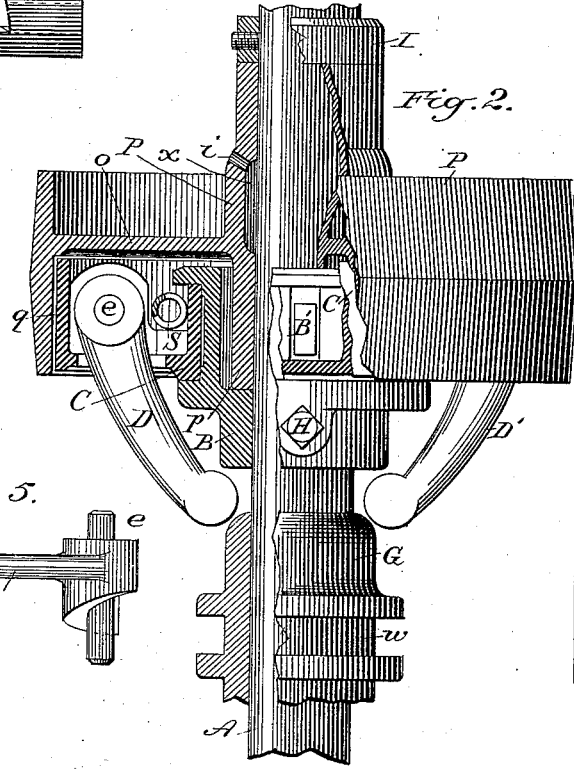
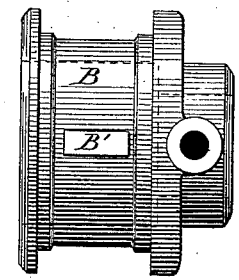
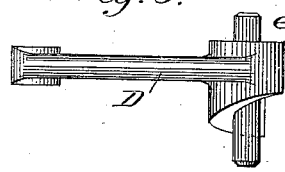
Witnesses:
Inventor:
John C. Blevney.

UNITED STATES PATENT OFFICE.

JOHN C. BLEVNEY, OF NEWARK, NEW JERSEY, ASSIGNOR TO THE BLEVNEY MANUFACTURING COMPANY, OF SAME PLACE.

FRICTION-CLUTCH.

SPECIFICATION forming part of Letters Patent No. 306,127, dated October 7, 1884.

Application filed December 10, 1883. (No model.)

*To all whom it may concern:*

Be it known that I, JOHN C. BLEVNEY, a citizen of the United States, residing at Newark, in the county of Essex and State of New Jersey, have invented certain new and useful Improvements in Friction-Clutches; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to improvements in friction-clutches; and the objects of my invention are to provide a friction-clutch that is of a construction cheaply to manufacture, that will form a strong clutch or friction with small power applied, and avoid all strain upon the shaft. I attain these objects by the mechanism illustrated in the accompanying drawings, in which—

Figure 1 is a cross-sectional view; Fig. 2, a longitudinal sectional view; Fig. 3, one of the two contact-sections. Fig. 4 is a cam. Fig. 5 is a lever operating with Fig. 4, and Fig. 6 is a collar fitted to receive the contact-sections, as hereinafter described.

Similar parts are referred to by similar letters throughout the several views.

C and C''' are the contact-sections or friction-shoes. They form sectors of a pulley cast as a whole. The said pulley is provided in duplicate with the cut $c'$ $c''$, the boss $b$ to receive the pin $e$ of the lever D, the boss $d$ to receive the cam E, and the screw F to secure the cam E to the sections, which pulley is bored to fit closely to the collar B, and turned to fit between the flanges of said collar and loose into the rim of the pulley P, after which it is cut through the center and between the bosses $b$ and $d$, so forming the friction-shoes C and C'''. The collar B is secured to the shaft A by a set-screw, and forms a cylinder with flanges turned to receive the hubs of C and C'''. It is provided with a boss, B', to engage loosely with the cut $c'$ $c''$ of the shoe C''', preventing the shoes from sliding around the collar B. It incloses the hub $p$ of the pulley P, receiving any oil or lubricants escaping from that end of the bearing of the pulley P.

E is a cam of a pitch equal to its diameter, and is secured to C''' by a set-screw. It has the hole through its center to receive the pin $e$ of the lever D. The lever D moves with a pin, $e$, in the boss $b$, and in the cam E. It has a cam fitting to, and operating in conjunction with, the cam E that will, when the lever is moved in the direction from the shaft A, press the friction-shoes apart S is a continuous spiral spring, laid around the hubs of C and C''', clamping and holding them to the collar B. The collar I, secured to shaft A by a set-screw, in combination with the collar B, holds the pulley from moving lengthwise on the shaft A. The cone G is fitted loose to the shaft A, and serves to move the levers D D' apart. The pulley P has the surface $q$ of its rim turned true to its bearing. The hub of said pulley is provided with the oil-recess $x$ and the oil-hole $i$. The hub $p$ gives it a long bearing.

To operate the friction-clutch, I have the pulley P revolving and move the cone G toward the collar B, Fig. 2. I force thereby the levers D and D' apart. This presses the shoes C and C''' apart and so brings them in contact with the pulley P with a pressure equal to the power applied to the cone G, the gain through the levers D and D' and the conical form of G, thereby causing the friction-shoes C and C''' to impinge against the inner periphery of pulley P, causing the shaft A to revolve. Returning the cone to its former position, the levers D and D' are released and returned to their former position by the action of the spring S, thereby relieving the friction upon pulley P and causing shaft A to cease its revolution. When C and C''' are moved apart, as described, they leave the cylindrical surface of the collar B, forming their rest, against which the spring S presses them, and move toward the rim of the pulley P, finding their rest and exerting the pressure only in the rim of pulley P and upon the cams E E alike, moving the shaft A by means of the boss B' on the collar B, as if the pulley P were moving the shaft by means of a key or pin passing through it. Should only one lever be used, the same result would be apparent, with this difference, that there would be a friction or strain upon the shaft occasioned by the application of the power on one side of the shaft, while with two or more levers at equal distances one from the other a uniform pressure would be exerted on the cone G only, leaving it to slide free on the shaft. The power applied to the lever D would be transmitted to the shoes C and C''' until they strike the pulley P, when the pressure upon the lever D' would be equal to that of D, independent of the position it might have to the shaft.

I do not confine myself to two sectors or shoes, as three or more will give the same or a better result.

The pulley P, combined with the shoes C and C''' and the collar B, forms a casing protecting the surfaces within from dust.

To regulate for the wear, I release one of the cams E, revolve it accordingly around its center to increase or diminish the pressure of the shoes, and secure it by the set-screw F.

Having described my invention, I claim and desire to secure by Letters Patent—

1. In a friction-clutch, the collar B, secured to the shaft A, in combination with the pulley P, and the friction-shoes C C''', for the purpose substantially as set forth.

2. In a friction-clutch, the collar B, having the boss B', and being secured to the shaft A, in combination with the sectors or friction-shoes C C''', having each a hub which is provided with slots or cuts, as c' c'', for the purpose substantially as set forth.

3. In a friction-clutch, the friction-shoes C C''', forming sectors of a pulley, and having secured to them the cam E, in combination with the lever D, operating in conjunction with said cam, and between said friction-shoes, for the purpose substantially as set forth.

4. In a friction-clutch, the combination of the friction-shoes C C''', forming sectors of a pulley, and having secured to them the movable cams E E by a set-screw, F, and the levers D D', with means for operating them, the collar B, and the spring S, for the purpose substantially as set forth.

5. In a friction-clutch, the combination of the pulley P, the collar B, secured to the shaft A, the friction-shoes C C''', forming sectors of a pulley, having cams secured to them, the levers D D', with means for operating them, for the purpose substantially as set forth.

6. In a friction-clutch, two or more friction-shoes, forming sectors of a pulley, clamped to the collar B by a spring, S, and the levers D D', in combination with the cams E E, for the purpose substantially as set forth.

In testimony that I claim the foregoing I have hereunto set my hand this 8th day of December, 1883.

JOHN C. BLEVNEY.

Witnesses:
VINCENT GABRIEL,
J. T. BRADLEY.